United States Patent
Matsuya et al.

(10) Patent No.: US 11,342,551 B2
(45) Date of Patent: May 24, 2022

(54) ZINC SECONDARY BATTERY

(71) Applicant: NGK INSULATORS, LTD., Nagoya (JP)

(72) Inventors: Junki Matsuya, Nagoya (JP); Yuichi Gonda, Nagoya (JP); Takeshi Yagi, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/819,553

(22) Filed: Mar. 16, 2020

(65) Prior Publication Data

US 2020/0220158 A1    Jul. 9, 2020

Related U.S. Application Data

(63) Continuation of application No. PCT/JP2018/035671, filed on Sep. 26, 2018.

(30) Foreign Application Priority Data

Oct. 20, 2017    (JP) .............................. JP2017-203795

(51) Int. Cl.
    *H01M 4/24*    (2006.01)
    *H01M 12/08*   (2006.01)
    (Continued)

(52) U.S. Cl.
    CPC .............. *H01M 4/244* (2013.01); *H01M 4/32* (2013.01); *H01M 4/52* (2013.01); *H01M 10/28* (2013.01);
    (Continued)

(58) Field of Classification Search
    CPC .......... H01M 4/244; H01M 4/32; H01M 4/52; H01M 2/1646; H01M 2/1653;
    (Continued)

(56) References Cited

U.S. PATENT DOCUMENTS

2005/0064292 A1 * 3/2005 Phillips ............... H01M 2/1686
                                                    429/246
2010/0316906 A1 * 12/2010 Nansaka ............. H01M 2/1094
                                                    429/181
(Continued)

FOREIGN PATENT DOCUMENTS

JP    H04-163857 A1    6/1992
JP    2013-504169 A1   2/2013
(Continued)

OTHER PUBLICATIONS

EPO machine generated English translation of KR-2016-0041280-A (Year: 2016).*
(Continued)

*Primary Examiner* — Christopher P Domone
*Assistant Examiner* — Kimberly Wyluda
(74) *Attorney, Agent, or Firm* — Burr & Brown, PLLC

(57) ABSTRACT

There is provided a secondary zinc battery including: a unit cell including; a positive-electrode plate including a positive-electrode active material layer and a positive-electrode collector; a negative-electrode plate including a negative-electrode active material layer containing zinc and a negative-electrode collector; a layered double hydroxide (LDH) separator covering or wrapping around the entire negative-electrode active material layer; and an electrolytic solution. The positive-electrode collector has a positive-electrode collector tab extending from one edge of the positive-electrode active material layer, and the negative-electrode collector has a negative-electrode collector tab extending from the opposite edge of the negative-electrode active material layer and beyond a vertical edge of the LDH separator. The unit cell can thereby collects electricity from the positive-electrode collector tab and the negative-electrode collector tab. The LDH separator has at least two continuous closed edges, provided that an edge, adjacent to
(Continued)

the negative-electrode collector tab, of the LDH separator is open.

12 Claims, 8 Drawing Sheets

(51) Int. Cl.
*H01M 50/411* (2021.01)
*H01M 50/431* (2021.01)
*H01M 50/449* (2021.01)
*H01M 50/466* (2021.01)
*H01M 4/32* (2006.01)
*H01M 4/52* (2010.01)
*H01M 10/28* (2006.01)
*H01M 10/30* (2006.01)
*H01M 50/463* (2021.01)

(52) U.S. Cl.
CPC ........... *H01M 10/30* (2013.01); *H01M 12/08* (2013.01); *H01M 50/411* (2021.01); *H01M 50/431* (2021.01); *H01M 50/449* (2021.01); *H01M 50/463* (2021.01); *H01M 50/466* (2021.01); *H01M 2300/0014* (2013.01)

(58) Field of Classification Search
CPC .. H01M 2/1686; H01M 2/021; H01M 2/0217; H01M 10/28; H01M 10/30; H01M 12/08; H01M 2300/0014; H01M 50/463; H01M 50/449; H01M 50/466; H01M 50/431; H01M 50/411
See application file for complete search history.

(56) References Cited

U.S. PATENT DOCUMENTS

| | | | |
|---|---|---|---|
| 2011/0059343 A1 | 3/2011 | McKinney et al. | |
| 2012/0279056 A1 | 11/2012 | McKinney et al. | |
| 2014/0030567 A1 | 1/2014 | McKinney et al. | |
| 2014/0315099 A1 | 10/2014 | Yamada et al. | |
| 2016/0276714 A1* | 9/2016 | Hayashi | H01M 2/1686 |
| 2017/0054127 A1* | 2/2017 | Kim | H01M 50/531 |
| 2017/0077476 A1 | 3/2017 | Kitoh et al. | |
| 2017/0200981 A1 | 7/2017 | Yokoyama et al. | |
| 2017/0214019 A1 | 7/2017 | Yokoyama et al. | |
| 2017/0229697 A1 | 8/2017 | Hayashi et al. | |

FOREIGN PATENT DOCUMENTS

| | | | |
|---|---|---|---|
| JP | 2017-004854 A1 | | 1/2017 |
| JP | 2017-016901 A1 | | 1/2017 |
| JP | 2017-091929 A1 | | 5/2017 |
| KR | 20160041280 A | * | 4/2016 |
| WO | 2013/118561 A1 | | 8/2013 |
| WO | 2016/067884 A1 | | 5/2016 |
| WO | 2016/076047 A1 | | 5/2016 |
| WO | 2017/002815 A1 | | 1/2017 |

OTHER PUBLICATIONS

English Translation of the Written Opinion of the International Searching Authority (Application No. PCT/JP2018/035671) dated Nov. 20, 2018.
International Search Report and Written Opinion (Application No. PCT/JP2018/035671) dated Nov. 20, 2018.
Extended European Search Report, European Application No. 18869075.4, dated April 12, 2021 (7 pages).

* cited by examiner

ZINC SECONDARY BATTERY

CROSS-REFERENCE TO RELATED APPLICATIONS

This application is a continuation application of PCT/JP2018/035671 filed Sep. 26, 2018, which claims priority to Japanese Patent Application No. 2017-203795 filed Oct. 20, 2017, the entire contents all of which are incorporated herein by reference.

BACKGROUND OF THE INVENTION

1. Field of the Invention

The present invention relates to a secondary zinc battery.

2. Description of the Related Art

In secondary zinc batteries, for example, secondary nickel-zinc batteries and secondary air-zinc batteries, it is known that metallic zinc dendrites precipitates on negative electrodes during a charge mode, penetrates through voids in separators, for example, non-woven fabrics and reach positive electrodes, resulting in short circuiting. Short circuiting caused by such zinc dendrites leads to a reduction in charge and discharge repetition lifetime of the secondary zinc batteries.

In order to solve such a problem, secondary zinc batteries have been proposed that include layered double hydroxide (LDH) separators selectively permitting the migration of hydroxide ions while blocking zinc dendrites. For example, Patent Document 1 (WO2013/118561) discloses a secondary nickel-zinc battery including a LDH separator disposed between a positive electrode and a negative electrode. Patent Document 2 (WO2016/076047) discloses a separator structure including a LDH separator that is fitted in or joined to a resin frame and has high denseness enough to inhibit permeation of gas and/or water. Patent Document 2 also discloses that the LDH separator may be a composite with a porous substrate. Patent Document 3 (WO2016/067884) discloses various methods of forming a dense LDH membrane on a porous substrate to give a composite material (LDH separator). The method includes the steps of: evenly depositing a starting material on a porous substrate to provide a start point of the growth of LDH crystals; and subjecting the porous substrate to a hydrothermal treatment in an aqueous stock solution for formation of the dense LDH membrane on the porous substrate.

SUMMARY OF THE INVENTION

A secondary zinc battery, for example, a secondary nickel-zinc battery including the LDH separator described above does not undergo short circuiting caused by zinc dendrites. In order to maximize such advantageous effects, the LDH separator should certainly separate the positive electrode from the negative electrode. In particular, it is significantly advantageous to achieve such a configuration of the separator while multiple positive and negative electrodes is readily assembled into a stacked-cell battery for generation of a high voltage and a large amount of current. Unfortunately, separation of a positive electrode from a negative electrode by a LDH separator in a traditional secondary zinc battery is achieved by a complicated and burdensome process involving joining the LDH separator to a battery container and sealing the joint by using a resin frame and/or an adhesive such that the liquid tightness is ensured. Thus, the battery configuration and the production process are likely to be complicated. Such a complicated battery configuration and process can be particularly significant in the case of a stacked-cell battery because the process involving joining the LDH separator to the battery container and sealing the joint in order to secure the liquid tightness must be carried out for each of unit cells of the stacked-cell battery.

The present inventors have discovered that by employing a LDH separator that covers or wraps around an entire negative-electrode active material layer and extending a positive-electrode collector tab and a negative-electrode collector tab in opposite directions, it is possible to omit the troublesome process involving joining the LDH separator to a battery container and sealing the joint and to provide a secondary zinc battery (particularly, a stacked-cell battery) that can block propagation of zinc dendrites and has a simple configuration that is easy to assemble and easy to collect electricity.

An object of the present invention is to provide a secondary zinc battery (particularly, a stacked-cell battery) that can block propagation of zinc dendrites in a simple configuration that is easy to assemble and easy to collect electricity.

According to an aspect of the present invention, there is provided a secondary zinc battery comprising:
  a unit cell comprising;
    a positive-electrode plate comprising a positive-electrode active material layer and a positive-electrode collector;
    a negative-electrode plate comprising a negative-electrode active material layer and a negative-electrode collector, the negative-electrode active material layer comprising at least one selected from the group consisting of elemental zinc, zinc oxide, zinc alloys, and zinc compounds;
    a layered double hydroxide (LDH) separator covering or wrapping around the entire negative-electrode active material layer; and
    an electrolytic solution,
  wherein the positive-electrode active material layer, the negative-electrode active material layer, and the LDH separator each have a quadrilateral planar shape,
  wherein the positive-electrode collector has a positive-electrode collector tab extending from a first edge of the positive-electrode active material layer, and the negative-electrode collector has a negative-electrode collector tab extending from a second edge of the negative-electrode active material layer and beyond a vertical edge of the LDH separator, the first edge being opposite to the second edge, the unit cell being capable of collecting electricity from the positive-electrode collector tab and the negative-electrode collector tab, the positive-electrode collector tab and the negative-electrode collector tab being disposed at opposite edges of the unit cell, and
  wherein the LDH separator has at least two continuous closed edges, provided that an edge, adjacent to the negative-electrode collector tab, of the LDH separator is open.

DETAILED DESCRIPTION OF THE INVENTION

Secondary Zinc Battery

A secondary zinc battery of the present invention may be of any type including zinc in a negative electrode and containing an alkali electrolytic solution (typically an aqueous alkali metal hydroxide solution). Thus, the secondary zinc battery of the invention may be a secondary nickel-zinc battery, a secondary silver oxide-zinc battery, a secondary manganese oxide-zinc battery, a secondary zinc-air battery, or any other type of secondary alkaline zinc battery. For example, the secondary zinc battery is preferably a secondary nickel-zinc battery including a positive electrode comprising nickel hydroxide and/or nickel oxyhydroxide. Alternatively, the secondary zinc battery may be a secondary zinc-air battery including a positive air electrode.

Figure 1:
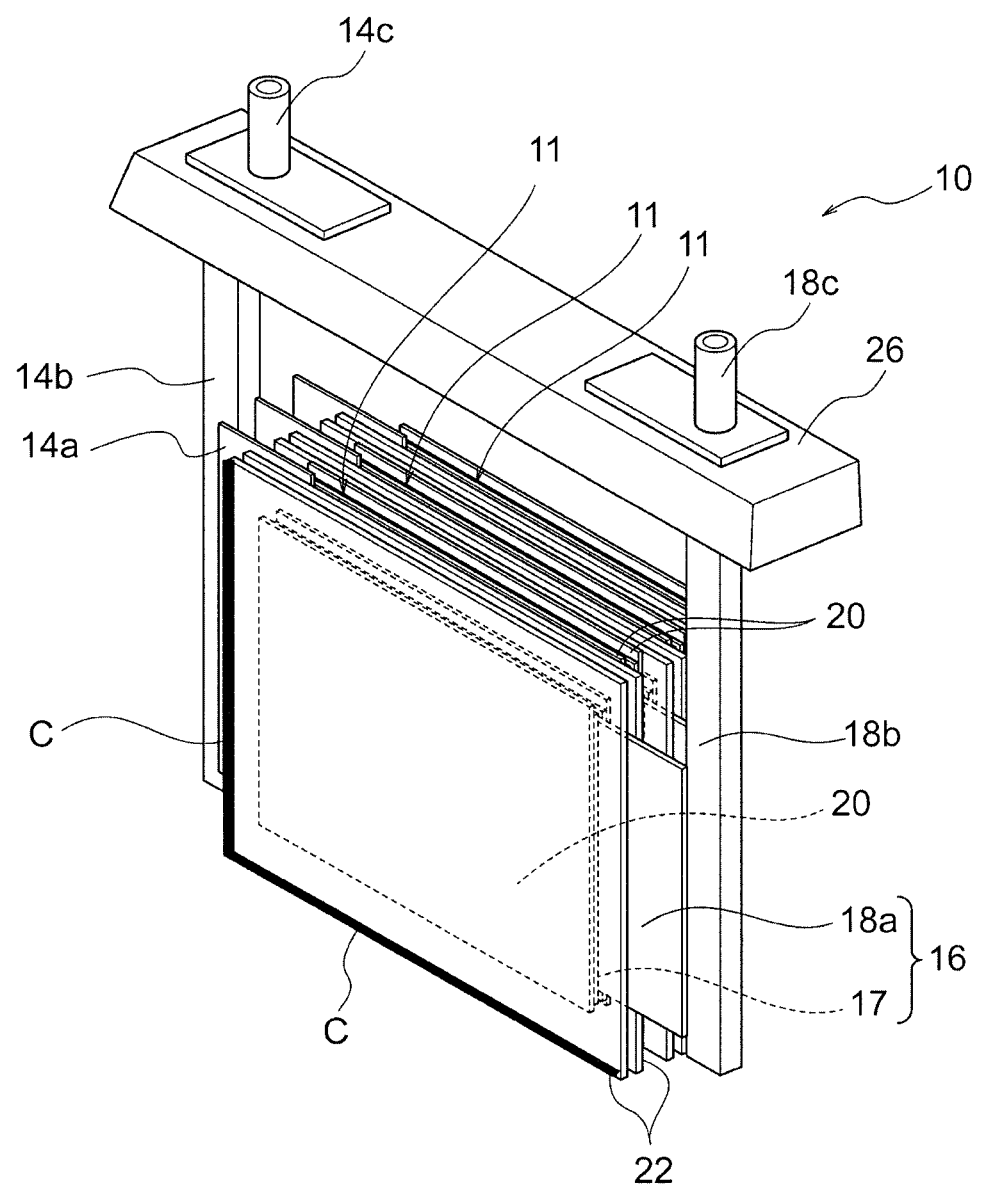
FIG. 1 is a perspective view of an exemplary internal structure of a secondary zinc battery of the present invention.
Figure 2:
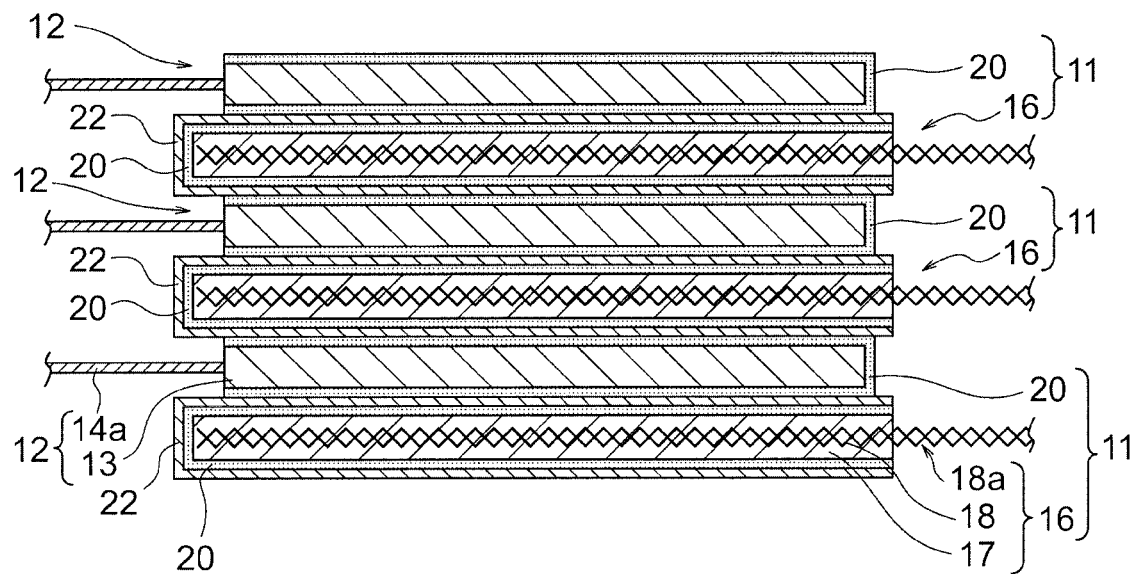
FIG. 2 is a conceptual schematic cross-sectional view illustrating a layered configuration of the secondary zinc battery in FIG. 1.
Figure 3:
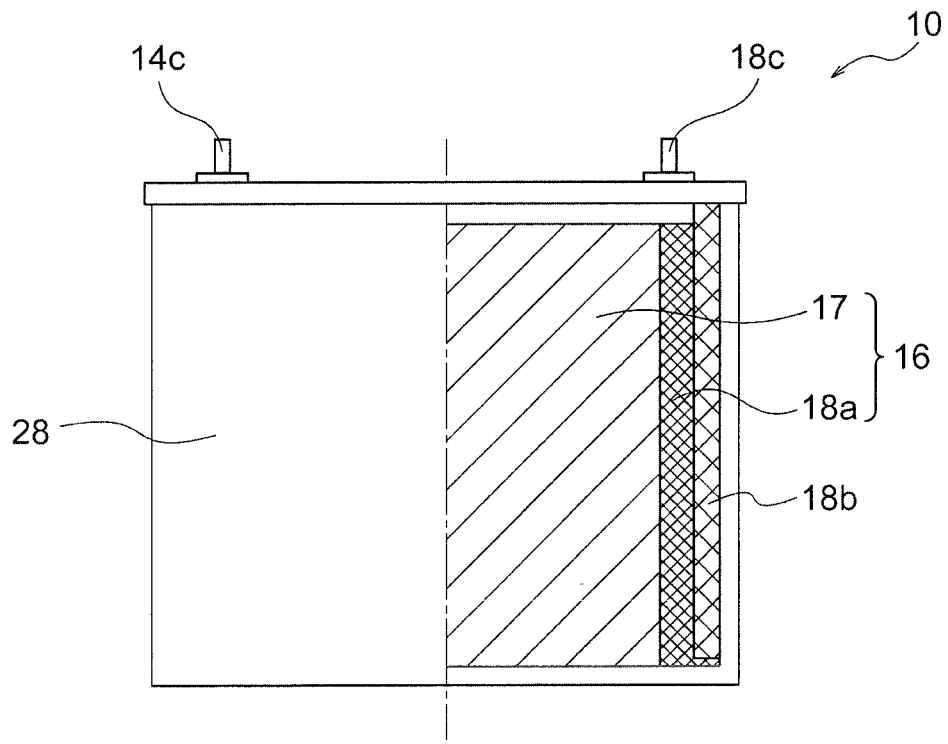
FIG. 3 illustrates the appearance and the internal structure of the secondary zinc battery in FIG. 1.

FIGS. 1 to 3 illustrate an exemplary secondary zinc battery of the present invention. A secondary zinc battery 10 illustrated in FIGS. 1 to 3 includes unit cells 11. The unit cells 11 each include a positive-electrode plate 12, a negative-electrode plate 16, a layered double hydroxide (LDH) separator 22, and an electrolytic solution (not shown). The positive-electrode plate 12 includes a positive-electrode active material layer 13 and a positive-electrode collector 14. The negative-electrode plate 16 includes a negative-electrode active material layer 17 and a negative-electrode collector 18. The negative-electrode active material layer 17 contains at least one selected from the group consisting of elemental zinc, zinc oxide, zinc alloys, and zinc compounds. The LDH separator 22 covers or wraps around the entire negative-electrode active material layer 17. Throughout this specification, the term "LDH separator" refers to a separator that contains LDH and permits selective migration of hydroxide ions due to the hydroxide-ion conductivity of the LDH. The positive-electrode active material layer 13, the negative-electrode active material layer 17, and the LDH separator 22 each have a quadrilateral planar shape. The positive-electrode collector 14 has a positive-electrode collector tab 14a extending from one edge of the positive-electrode active material layer 13. The negative-electrode collector 18 has a negative-electrode collector tab 18a extending from the opposite edge of the negative-electrode active material layer 17 and beyond a vertical or side edge of the LDH separator 22. As a result, the unit cell 11 can collect electricity from the positive-electrode collector tab 14a and the negative-electrode collector tab 18a that are disposed at opposite edges. The LDH separator 22 has at least two continuous closed edges C, with the proviso that an edge, adjacent to the negative-electrode collector tab, of the LDH separator 22 is open. By employing the LDH separator 22 that covers or wraps around the entire negative-electrode active material layer 17 and extending the positive-electrode collector tab 14a and the negative-electrode collector tab 18a in opposite directions, it is possible to omit the troublesome process involving joining the LDH separator 22 to a battery container and sealing the joint and to provide a secondary zinc battery (particularly, a stacked-cell battery) that can block propagation of zinc dendrites in a simple configuration that is easy to assemble and easy to collect electricity.

As described above, separation of a positive electrode from a negative electrode by a LDH separator in a traditional secondary zinc battery is achieved by a complicated and burdensome process involving joining the LDH separator to a battery container and sealing the joint by using a resin frame and/or an adhesive such that the liquid tightness is ensured. Thus, the battery configuration and the production process are likely to be complicated. Such a complicated battery configuration and process can be particularly significant in the case of a stacked-cell battery. In the secondary zinc battery 10 of the present invention, the entire negative-electrode active material layer 17 or the negative-electrode plate 16 is covered with or wrapped by the LDH separator 22. Thus, the negative-electrode plate 16 itself covered with or wrapped by the LDH separator 22 can prevent short circuiting caused by zinc dendrites. Hence, only stacking of the positive-electrode plate 12 and the negative-electrode plate 16, which is covered with or wrapped by the LDH separator 22, can achieve separation of the positive-electrode plate 12 from the negative-electrode plate 16 by the LDH separator. Since the positive-electrode collector tab 14a and the negative-electrode collector tab 18a extend in opposite directions, unintended contact of the positive-electrode collector 14 with the negative-electrode collector 18 can be certainly avoided and collection of electricity can be facilitated. This is significantly advantageous in that only alternate stacking of the positive-electrode plates 12 and the negative-electrode plates 16 can achieve a desired configuration, particularly, in the case of production of a stacked-cell battery including multiple unit cells: The traditional complicated and burdensome process can be omitted that involves joining a LDH separator to a battery container and sealing the joint for separation of a positive electrode from a negative electrode by the LDH separator. In the case of the stacked-cell battery, multiple positive-electrode collector tabs 14a can be bundled and connected to one positive-electrode collector plate 14b or one positive-electrode terminal 14c while multiple negative-electrode collector tabs 18a can be bundled and connected to one negative-electrode collector plate 18b or one negative-electrode terminal 18c. Collection of electricity can be thereby facilitated.

The unit cell 11 includes the positive-electrode plate 12, the negative-electrode plate 16, the LDH separator 22, and the electrolytic solution (not shown).

The positive-electrode plate 12 includes the positive-electrode active material layer 13. The positive-electrode active material layer 13 may be composed of any appropriately selected known material according to the type of a secondary zinc battery. For example, a positive electrode including nickel hydroxide and/or nickel oxyhydroxide may be used in a secondary nickel-zinc battery; or an air positive electrode may be used in a secondary zinc-air battery. The positive-electrode plate 12 further includes a positive-electrode collector (not shown). The positive-electrode collector has a positive-electrode collector tab 14a extending from the one edge of the positive-electrode active material layer 13. Preferred examples of the positive-electrode collector include porous nickel substrates, for example, foamed nickel plates. In this case, a porous nickel substrate is evenly coated with, for example, a paste containing an electrode active material, such as nickel hydroxide, and is then dried into a preferred platy positive electrode provided with a collector. Preferably, the dried platy positive electrode with the collector is compacted to prevent the detachment of the electrode active material and to increase the density of the electrode. Although the positive-electrode plate 12 in FIG. 2 includes a positive-electrode collector composed of, for example, foamed nickel, the positive-electrode collector is not shown. The positive-electrode collector is highly integrated with the positive-electrode active material layer 13 and thus cannot be separately illustrated. Preferably, the secondary zinc battery 10 further includes a positive-electrode collector plate 14b, which is connected to an end of the positive-electrode collector tab 14a. One positive-electrode collector plate 14b is more preferably connected to ends of multiple positive-electrode collector tabs 14a. Such a simple configuration facilitates collection of electricity while the space can be efficiently used. The connection of the positive-electrode collector plate 14b to the positive-electrode terminal 14c is also facilitated. The positive-electrode collector plate 14b itself may serve as a negative-electrode terminal.

The negative-electrode plate 16 includes a negative-electrode active material layer 17. The negative-electrode active material layer 17 contains at least one selected from the group consisting of elemental zinc, zinc oxide, zinc alloys, and zinc compounds. In other words, any form of zinc, for example, elemental zinc, zinc compound, or zinc alloy, that has an electrochemical activity suitable for a negative electrode may be used. Preferred examples of the material for the negative electrode include zinc oxide, elemental zinc, and calcium zincate. A mixture of elemental zinc and zinc oxide is more preferred. The negative-electrode active material layer 17 may be gelled. The negative-electrode active material layer 16 may be composed of a mixture of a negative-electrode active material and an electrolytic solution. For example, addition of an electrolytic solution and a thickener to the negative-electrode active material can readily produce a gelled negative electrode. Examples of the thickener include poly(vinyl alcohol), polyacrylate, carboxymethyl cellulose (CMC), and alginic acid. Poly(acrylic acid) is preferred because it has significant chemical resistance against strong alkalis.

A mercury-free zinc alloy or a lead-free zinc alloy may also be used. For example, a zinc alloy should preferably contain 0.01 to 0.1 mass % indium, 0.005 to 0.02 mass % bismuth, and 0.0035 to 0.015 mass % aluminum to inhibit emission of gaseous hydrogen. In particular, indium and bismuth are advantageous from the viewpoint of an improvement in discharge performance. Use of a zinc alloy in the negative electrode can reduce self-dissolution of the negative electrode in an alkaline electrolytic solution, resulting in reduced emission of gaseous hydrogen and thus enhanced safety.

The material for the negative electrode may have any form but preferably a powder form. The negative electrode thereby has a large surface area and can discharge a large current. A material, composed of a zinc alloy, for the negative electrode preferably has a mean particle size ranging from 3 to 100 μm in minor axis. A negative electrode composed of zinc alloy particles with a mean particle size in such a range has a large surface area and is thus suitable for discharge of a large amount of current. Such a material can be homogeneously mixed with an electrolytic solution and a gelling agent and readily handled during assembly of a battery.

Figure 5:
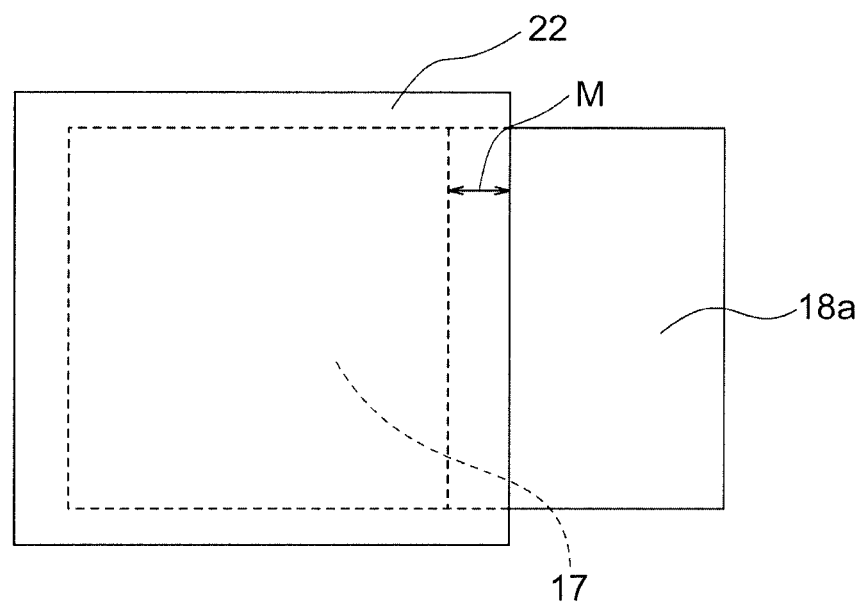
FIG. 5 is a schematic view indicating an area of the negative-electrode plate covered with the LDH separator in FIG. 4A.
Figure 6:
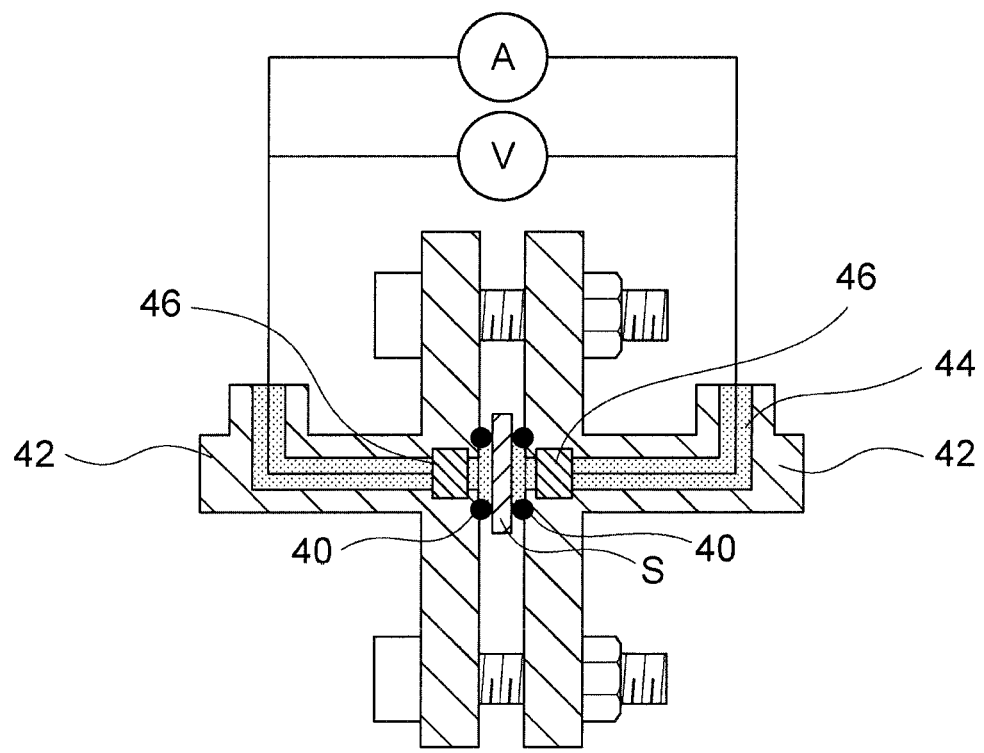
FIG. 6 is a schematic cross-sectional view illustrating an electrochemical measurement system used in Example 1.

The negative-electrode plate 16 includes the negative-electrode collector 18. The negative-electrode collector 18 has the negative-electrode collector tab 18a extending from one edge, remote from the positive-electrode collector tab 14a, of the negative-electrode active material layer 17 and beyond the vertical edge of the LDH separator 22. As a result, the unit cell 11 can collect electricity from the positive-electrode collector tab 14a and the negative-electrode collector tab 18a that are disposed at opposite edges. Preferably, the secondary zinc battery 10 includes the negative-electrode collector plate 18b, which is connected to an end of the negative-electrode collector tab 18a. One negative-electrode collector plate 18b is more preferably connected to ends of multiple negative-electrode collector tabs 18a. Such a simple configuration facilitates collection of electricity while the space can be efficiently used. The connection of the negative-electrode collector tab 18a to the negative-electrode terminal 18c is also facilitated. The negative-electrode collector plate 18b itself may serve as a negative-electrode terminal. Typically, one edge of the negative-electrode collector tab 18a should be preferably exposed from the LDH separator 22 and a liquid retention material 20 (if present). The exposed edge of the negative-electrode collector tab 18a enables desired connection of the negative-electrode collector 18 to the negative-electrode collector plate 18b and/or the negative-electrode terminal 18c. In this case, a vertical edge, adjacent to the negative-electrode collector tab 18a, of the negative-electrode active material layer 17 should preferably be covered with or wrapped by the LDH separator 22 with a margin M (for example, with a distance of 1 to 5 mm) such that the LDH separator 22 sufficiently hides the vertical edge, as illustrated in FIG. 5. This can more effectively block the propagation of the zinc dendrites from the vertical edge, adjacent to the negative-electrode collector tab 18a, of the negative-electrode active material layer 17 or from the neighborhood of the vertical edge.

Preferred examples of the negative-electrode collector 18 includes copper foils, expanded copper metals, and punched copper metals. Expanded copper metals are more preferred. For example, an expanded copper metal is coated with a mixture of powdered zinc oxide and/or elemental zinc and a binder (for example, particulate polytetrafluoroethylene) as desired. A preferred platy negative electrode provided with a collector can be thereby produced. Preferably, the dried platy negative electrode with the collector is compacted to prevent the detachment of the electrode active material and to increase the density of the electrode.

It is preferred that the secondary zinc battery 10 further includes a liquid retention material 20 disposed between the negative-electrode active material layer 17 and the LDH separator 22 and cover or wrap around the entire negative-electrode active material layer 17. An electrolytic solution can be uniformly distributed between the negative-electrode active material layer 17 and the LDH separator 22, resulting in effective migration of hydroxide ions between the negative-electrode active material layer 17 and the LDH separator 22. The liquid retention material 20 may be of any type that can hold an electrolytic solution. The liquid retention material 20 should preferably be sheeted. Preferred examples of the liquid retention material include non-woven fabrics, water-absorbing resins, liquid retaining resins, porous sheets, and spacers. The non-woven fabrics are particularly preferred because a low-cost high-performance negative-electrode structure can be produced. The liquid retention material 20 preferably has a thickness of 0.01 to 0.20 mm, more preferably 0.02 to 0.20 mm, further preferably 0.02 to 0.15 mm, particularly preferably 0.02 to 0.10 mm, most preferably 0.02 to 0.06 mm. The liquid retention material 20 having a thickness in such a range can minimize the size of the overall negative-electrode structure while holding a sufficient volume of electrolytic solution.

Figure 4A:
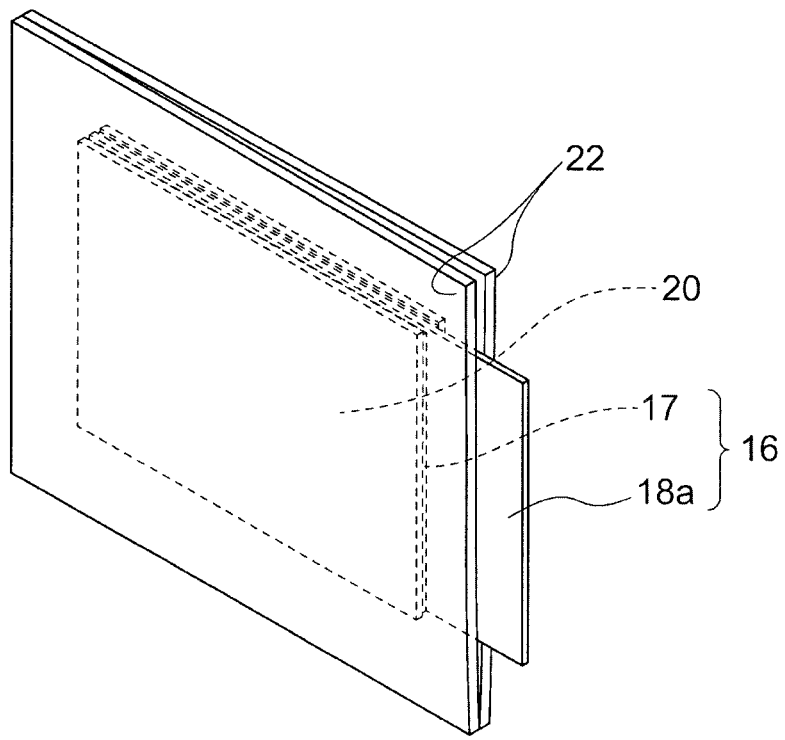
FIG. 4A is a perspective view of an exemplary negative-electrode plate including a negative-electrode active material layer covered with a LDH separator of the secondary zinc battery of the present invention.
Figure 4B:
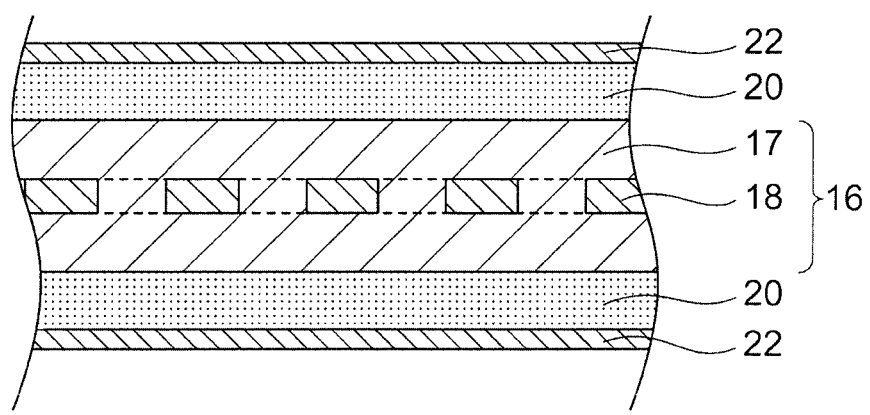
FIG. 4B is a schematic cross-sectional view illustrating a layered configuration of the negative-electrode plate in FIG. 4A.

The entire negative-electrode active material layer 17 is covered with or wrapped by the LDH separator 22. FIGS. 4A and 4B illustrate a preferred embodiment of the negative-electrode plate 16 including the negative-electrode active material layer 17 covered with or wrapped by the LDH separator 22. The negative-electrode structure in FIGS. 4A and 4B includes the negative-electrode active material layer 17, the negative-electrode collector 18, and optionally the liquid retention material 20. The entire negative-electrode active material layer 17 is covered with or wrapped by the LDH separator 22 (optionally, with the intervention of the liquid retention material 20). As described above, the entire negative-electrode active material layer 17 covered with or wrapped by the LDH separator 22 (optionally, with the intervention of the liquid retention material 20) can omit a troublesome process involving joining the LDH separator 22 to a battery container and sealing the joint. A secondary zinc battery (particularly, a stacked-cell battery) that can block the propagation of the zinc dendrites can be thereby produced in a significantly simple and highly productive way.

In FIGS. 4A and 4B, the liquid retention material 20 is depicted to be smaller than the LDH separator 22. Alternatively, the liquid retention material 20 may have the same dimensions as the LDH separator 22 (or a folded LDH separator 22) such that the edges of the liquid retention material 20 and the edges of the LDH separator 22 reside at the same position. In other words, the liquid retention material 20 may be held between two folded or two bonded segments of the LDH separator 22. This structure enables effective sealing of an edge of the LDH separator 22 by thermal or ultrasonic welding, which will be described below. In other words, the edges of the LDH separator 22 can be more effectively sealed by indirect thermal or ultrasonic welding by the intervention of the thermally weldable liquid retention material 20 than direct thermal or ultrasonic welding, resulting in more effective sealing due to the thermal weldability of the liquid retention material 20. In consequence, the edges, to be sealed with that of the LDH separator 22, of the liquid retention material 20 can serve as a hot-melt adhesive. Preferred examples of the liquid retention material 20 in this case include non-woven fabrics, particularly non-woven fabrics composed of thermoplastic resin (for example, polyethylene or polypropylene).

The LDH separator 22 includes LDH and a porous substrate. The pores of the substrate are filled with the LDH, so that the LDH separator 22 has hydroxide-ion conductivity and gas-impermeability (and thus permits migration of hydroxide ions). The porous substrate is preferably composed of a polymeric material. The LDH is particularly preferably incorporated into the polymeric porous substrate over the entire thickness thereof. Various preferred embodiments of the LDH separator 22 will be detailed below.

In a typical embodiment, one LDH separator 22 is provided on one side of the negative-electrode active material layer 17. In detail, one LDH separator 22 is folded onto the two sides of the negative-electrode active material layer 17. Alternatively, two separator segments of the LDH separator 22 are respectively provided on the two sides of the negative-electrode active material layer 17. Alternatively, two or more plies of LDH separators 22 may be provided on the two sides of the negative-electrode active material layer 17. For example, several plies of LDH separators 22 may cover or wrap around the entire negative-electrode active material layer 17 (that may be covered with or wrapped by the liquid retention material 20).

As describe above, the LDH separator 22 has a quadrilateral planar shape. The LDH separator 22 or the separator segments of the LDH separator 22 have at least two continuous closed edges C, with the proviso that the edge, adjacent to the negative-electrode collector tab 18a, of the LDH separator 22 is open. Such a LDH separator 22 can certainly separate the negative-electrode active material layer 17 from the positive-electrode plate 12 and more effectively block the propagation of zinc dendrites. The edges C to be sealed do not include one edge, adjacent to the negative-electrode collector tab 18a, of the LDH separator 22 such that negative-electrode collector tab 18a can extend to the exterior.

In a preferred embodiment of the present invention, the unit cell 11 is disposed such that the positive-electrode plate 12, the negative-electrode plate 16, and the LDH separator 22 are vertically disposed and such that one closed edge of the LDH separator 22 resides on the bottom. As a result, the positive-electrode collector tab 14a and the negative-electrode collector tab 18a extend from opposite edges of the unit cell 11. This further facilitates collection of electricity. In the case that the upper edge of the LDH separator 22 is open as will be described below, the upper edge of the LDH separator 22 is not blocked. Thus, the migration of gas between the positive-electrode plate 12 and the negative-electrode plate 16 can be further facilitated.

The LDH separator 22 may be open on one or two edges. Even if, for example, the upper edge of the LDH separator 22 is open, an electrolytic solution can be injected so as not to reach the upper edge of the LDH separator during production of the secondary zinc battery. Since the electrolytic solution is below the upper edge of the LDH separator, the leakage of the solution and the propagation of zinc dendrites can be avoided. In this regards, the unit cell 11 as well as the positive-electrode plate 12 are accommodated into a closed container or a case 28 and covered with a lid 26 as desired. The unit cell 11 can serve as a main component of a sealed type of secondary zinc battery. The case 28 eventually ensure the air-tightness of the unit cell 11; hence, the unit cell 11 itself may have a simple configuration with an open upper edge. Since the LDH separator 22 is open on one edge, the negative-electrode collector tab 18a can extend therefrom.

The upper edge of the LDH separator 22 is preferably open. This configuration with the open upper edge can solve a problem caused by overcharge of, for example, a nickel-zinc battery. If the nickel-zinc battery is overcharged, oxygen ($O_2$) may be generated at the positive-electrode plate 12. The LDH separator 22 has high denseness that substantially permit migration of only hydroxide ions, but not migration of $O_2$. The configuration with the open upper edge enables $O_2$ to escape from the open upper edge of the positive-electrode plate 12 to the negative-electrode plate 16, in the case 28. $O_2$ then reacts with Zn in the negative-electrode active material layer 17 into ZnO. The unit cell 11 of open top type, which permits such reaction cycles of oxygen, can be used in a sealed type of secondary zinc battery to enhance durability to overcharge. It should be noted that a LDH separator 22 with a closed upper edge can also achieve the same effects as the LDH separator 22 with the open upper edge if a vent is disposed at any position of the closed upper edge. For example, the vent may be formed after sealing of the upper edge of the LDH separator 22. Alternatively, part of the upper edge may be left unsealed during sealing of the LDH separator 22 for formation of a vent.

In any case, it is preferred to close the edges C of the LDH separator 22 by folding it and/or sealing the separator segments of the LDH separator 22. Preferred examples of sealing techniques include adhesives, thermal welding, ultrasonic welding, adhesion tapes, sealing tapes, and combination thereof. In particular, the LDH separator 22 including a porous substrate composed of a polymeric material is advantageous in that it is flexible and thus readily foldable. Hence, it is preferred to form an elongated LDH separator 22 and then fold the LDH separator 22 such that one edge of the LDH separator 22 is automatically closed. Thermal or ultrasonic welding may be carried out with a commercially available heat sealer. For sealing of the LDH separator 22, it is preferred to hold the liquid retention material 20 between two folded or two bonded segments of the LDH separator 22 and to carry out thermal or ultrasonic welding because more effective sealing can be achieved. A commercially available adhesive, adhesion tape, or sealing tape may be used that preferably contains resin having high alkaline resistance in order to prevent degradation in an alkaline electrolytic solution. Examples of adhesives preferred from this point of view include epoxy resin adhesives, natural resin adhesives, modified olefin resin adhesives, and modified silicone resin adhesives. Among them, epoxy resin adhesives are particularly preferred because they have significantly high alkaline resistance. An exemplary commercial product of an epoxy resin adhesive is Hysol® (available from Henkel).

The electrolytic solution preferably contains an aqueous alkali metal hydroxide solution. Although not illustrated, the positive electrode plate 12 (particularly, the positive-electrode active material layer 13) and the negative-electrode plate 16 (particularly, the negative-electrode active material layer 17) are entirely immersed in the electrolytic solution. Examples of alkali metal hydroxide include potassium hydroxide, sodium hydroxide, lithium hydroxide, and ammonium hydroxide. Potassium hydroxide is more preferred. In order to inhibit self-dissolution of zinc and/or zinc oxide, a zinc compound, for example, zinc oxide or zinc hydroxide may be added to the electrolytic solution. As described above, the electrolytic solution may be mixed with a positive-electrode active material or a negative-electrode active material to yield a mixture of the electrolytic solution and the positive-electrode active material or a mixture of the electrolytic solution and the negative-electrode active material. In order to prevent leakage of the electrolytic solution, the electrolytic solution may be gelled. A polymeric gelling agent is preferably used that absorbs the solvent in the electrolytic solution to swell. For example, a polymer such as polyethylene oxide, poly(vinyl alcohol), or polyacrylamide, or starch is used.

As illustrated in FIGS. 2 and 3, the secondary zinc battery 10 may further include at least one case 28 that accommodates the unit cell 11. Two or more unit cells 11 may be accommodated in the respective cases 28. This is a configuration of a so-called stacked-cell battery and is advantageous in that a high voltage and a large amount of current can be generated. The case 28 accommodating the unit cells 11 is preferably composed of resin. The resin contained in the case 28 preferably has resistance against alkali metal hydroxide, for example, potassium hydroxide and is more preferably polyolefin, acrylonitrile butadiene styrene (ABS), or modified polyphenylene ether, further preferably ABS or modified polyphenylene ether. A group of two or more arrayed cases 28 may be accommodated in an outer frame to serve as a battery module.

LDH Separator

The LDH separator 22 contains layered double hydroxide (LDH). The LDH separator 22 incorporated into a secondary zinc battery separates a positive-electrode plate from a negative-electrode plate and can conduct hydroxide ions. In other words, the LDH separator 22 is a hydroxide-ion-conductive separator. The LDH separator 22 is preferably gas-impermeable and/or water-impermeable. In other words, the LDH separator 22 is preferably dense enough to be gas-impermeable and/or water-impermeable. The term "gas-impermeable" in this specification indicates that a tested object exposed to helium gas at a differential pressure of 0.5 atm on one side of the object blocks passage of the helium gas to the other side in water and thus no bubble is generated, as defined in Patent Documents 2 and 3. The term "water-impermeable" in this specification indicates that water in contact with one side of the tested object does not permeate to the other side as defined in Patent Documents 2 and 3. In other words, the gas-impermeable and/or water-impermeable LDH separator 22 has high denseness that blocks gas or water and thus is not composed of a gas-permeable or water-permeable porous film or any other porous material. Thus, the LDH separator 22 selectively permits the migration of hydroxide ions by means of its hydroxide ion conductivity and can serve as a battery separator. Hence, the LDH separator 22 has a highly effective configuration to physically restrict the penetration of the zinc dendrites formed during the charge mode through the separator and prevent short circuiting between the positive electrode and the negative electrode. The hydroxide-ion-conductive LDH separator 22 permits the effective migration of hydroxide ions, which is required between the positive-electrode plate and the negative-electrode plate. The LDH separator 22 can achieve reactions in the positive-electrode plate and negative-electrode plate during the charge and discharge modes.

The LDH separator 22 preferably has a He permeability per unit area of 10 cm/min·atm or less, more preferably 5.0 cm/min·atm or less, further preferably 1.0 cm/min·atm or less. The LDH separator having a He permeability of 10 cm/min·atm or less can effectively restrict the migration of Zn (typically zinc ions or zincate ions) in the electrolytic solution. The separator of the present embodiment can significantly restrict the migration of Zn. The restriction of the migration of zinc through the separator can effectively restrict the growth of the zinc dendrites in a secondary zinc battery by principle of operation. The He permeability is measured through a step of supplying a He gas to one side of the separator to cause the He gas to pass through the separator and a step of calculating the He permeability to evaluate the denseness of the separator. The He permeability is calculated according to an expression F/(P×S), where F represents the volume of the passing He gas per unit time, P a differential pressure applied to the separator during the passage of the He gas, and S a membrane area through which the He gas passes. The measured He permeability can provide a high level of evaluation of the denseness of the separator. For example, whether the separator has high denseness can be effectively evaluated. The separator having such high denseness blocks the migration of substances other than hydroxide ions, in particular, zinc causing growth of zinc dendrites as much as possible or permits only an infinitesimal volume of such substances to migrate: the He gas has the smallest atomic size among gaseous atoms and molecules and has an extremely low reactivity. In other words, He atoms can be present in a gaseous form without constructing molecules. In contrast, hydrogen present in a gaseous form consists of $H_2$ molecules. A gaseous He atom is smaller than a gaseous $H_2$ molecule. The gaseous $H_2$ is inherently flammable and thus hazardous. The He gas permeation rate defined by the expression above can be used for a simple and objective measure of the denseness regardless of differences in dimensions of samples and conditions for measurement. Whether the separator has high denseness suitable for use in a secondary zinc battery can be thereby evaluated in a simple, safe, and effective way. The He permeability can be measured in a preferred manner according to the steps in Evaluation 7 in Example 1, which will be described below.

As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH are each composed of anions and $H_2O$. The anions are monovalent or multivalent anions, preferably monovalent or divalent ions. Preferably, the anions in the LDH include $OH^-$ and/or $CO_3^{2-}$. The LDH has high ionic conductivity based on its inherent properties.

The known LDH is generally represented by the basic formula $M^{2+}_{1-x}M^{3+}_x(OH)_2A^{n-}_{x/n}\cdot mH_2O$, where $M^{2+}$ is a divalent cation, $M^{3+}$ is a trivalent cation, $A^{n-}$ is an n-valent anion, n is an integer of 1 or more, x ranges from 0.1 to 0.4, and m is 0 or more. In this basic formula, $M^{2+}$ may be any divalent cation. Preferred examples of such a cation include $Mg^{2+}$, $Ca^{2+}$ and $Zn^{2+}$. A more preferred example is $Mg^{2+}$. $M^{3+}$ may be any trivalent cation. Preferred examples of such a cation include $Al^{3+}$ and $Cr^{3+}$. A more preferred example is $Al^{3+}$. $A^{n-}$ may be any anion. Preferred examples of such an anion include $OH^-$ and $CO_3^{2-}$. In the basic formula, $M^{2+}$ preferably includes $Mg^{2+}$. $M^{3+}$ preferably includes $Al^{3+}$. $A^{n-}$ preferably includes $OH^-$ and/or $CO_3^{2-}$. In the formula, n is an integer of 1 or more and is preferably 1 or 2; x ranges from 0.1 to 0.4, preferably ranges from 0.2 to 0.35; and m is any number that indicates the molar number of the water where m is a real number of 0 or more, typically a real number above 0, preferably 1 or more. It should be noted that the basic formula is an exemplary representation of the LDH. The ion species in the formula may be appropriately replaced with any other ion species. For example, the $M^{3+}$ ions may be at least partly replaced with quadrivalent or higher valent cations in the basic formula. In such a case, the coefficient x/n of the anion $A^{n-}$ in the formula may be appropriately varied.

For example, the basic hydroxide layers of the LDH may be composed of Ni, Ti, OH groups and optional incidental impurities. The intermediate layers of the LDH are composed of anions and $H_2O$ as described above. Although the alternately stacked structure itself of basic hydroxide layers and intermediate layers is basically the same as the commonly known alternately stacked structure of the LDH, the LDH of the embodiment, which is composed of the basic hydroxide layers mainly having Ni, Ti, and OH groups of LDH, can exhibit high alkaline resistance. Although the reason is not clear, it is believed that no element (for example, Al) easily dissolved in an alkaline solution is intentionally added to the LDH of the embodiment. Nevertheless, the LDH of the embodiment can also exhibit high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Ti in the LDH can have the form of titanium ions. Although titanium ions in the LDH are typically believed to be $Ti^{4+}$, they may be present in any other valence, for example, $Ti^{3+}$. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni and Ti are not necessarily confirmed. Assuming that the basic hydroxide layers are mainly composed of $Ni^{2+}$, $Ti^{4+}$ and OH groups, the basic composition of the corresponding LDH can be represented by the general formula: $Ni^{2+}_{1-x}Ti^{4+}_x(OH)_2A^{n-}_{2x/n}\cdot mH_2O$, wherein $A^{n-}$ is an n-valent anion, n is an integer of 1 or more, preferably 1 or 2, x is above 0 to below 1, preferably 0.01 to 0.5, and m is a real number of 0 or more, typically a real number above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, and $Ti^{4+}$ do not impair the basic properties of LDH.

Alternatively, the basic hydroxide layers of LDH may be composed of Ni, Al, Ti and OH groups. The intermediate layers are composed of anions and $H_2O$ as described above. Although the alternately stacked structure itself of basic hydroxide layers and intermediate layers is basically the same as the generally known alternately stacked structure of LDH, the LDH of the embodiment, which is composed of the basic hydroxide layers mainly having Ni, Al, Ti and OH groups of LDH, can exhibit high alkaline resistance. Although the reason is not clear, it is believed that Al, which has been considered to be easily dissolved in an alkaline solution, is hard to be dissolved in the alkaline solution due to some interaction with Ni and Ti. Nevertheless, the LDH of the embodiment can also exhibit high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of aluminum ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions as long as they contain Ni, Al, Ti and OH groups. However, the basic hydroxide layers preferably contain Ni, Al, Ti and OH groups as main constituent elements. That is, it is preferred that the basic hydroxide layers are mainly composed of Ni, Al, Ti and OH groups. Accordingly, the basic hydroxide layers are typically composed of Ni, Al, Ti, OH groups and optional incidental impurities. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni, Al and Ti are not necessarily confirmed. Assuming that the basic hydroxide layers are mainly composed of $Ni^{2+}$, $Al^{3+}$, $Ti^{4+}$ and OH groups, the basic composition of the corresponding LDH can be represented by the general formula: $Ni^{2+}_{1-x-y}Al^{3+}_{x}Ti^{4+}_{y}(OH)_2A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

The porous substrate has water-permeability and gas-permeability. It should be appreciated that the porous substrate incorporated into the secondary zinc battery permits the electrolytic solution to reach the LDH. The LDH separator including the porous substrate can stably hold hydroxide ions. The LDH separator 22 of the porous substrate has high strength and can be thinned to have a low electrical resistance.

As described above, the LDH separator 22 includes (or is typically composed of) the LDH and the porous substrate. The pores of the porous substrate are filled with the LDH, so that the LDH separator 22 has hydroxide ion conductivity and gas impermeability (and thus function as the LDH separator exhibiting hydroxide ion conductivity). It is particularly preferred that the LDH be incorporated into the porous substrate over the entire thickness thereof. The LDH separator 22 preferably has a thickness of 5 to 200 μm, more preferably 5 to 100 μm, further preferably 5 to 30 μm.

Preferably, the porous substrate is composed of a polymeric material. The polymeric porous substrate has the following advantages: 1) high flexibility (thus, the porous substrate cannot break even if it is thinned), 2) high porosity, 3) high ion conductivity (a thinned porous substrate can still have a high porosity), and 4) ease of production and handling of a substrate. The advantage 1) high flexibility leads to an additional advantage 5) ready folding of one LDH separator 22 or hermetic joining of two LDH separators 22. The LDH separator 22 including the polymeric porous substrate can have at least one closed edge (a folded LDH separator is further advantageous in that sealing of one edge of the LDH separator is not necessary). Preferred examples of the polymeric material include polystyrene, polyethersulfone, polypropylene, epoxy resin, poly(phenylene sulfide), hydrophilized fluororesin (such as tetrafluoro resin: PTFE), cellulose, nylon, polyethylene and any combination thereof. All these preferred materials have high resistance to the alkaline electrolytic solution of the battery. Further preferred polymeric materials are polyolefins such as, for example, polypropylene, polyethylene, most preferably polypropylene from the viewpoint of high resistance to hot water, high acid resistance and high alkaline resistance, as well as low cost. When the porous substrate is composed of the polymeric material, it is more preferred that the LDH layer is embedded into the entire porous substrate over the thickness (for example, most or substantially all of the pores inside the porous substrate are filled with the LDH). The preferred thickness of the polymeric porous substrate in this case is 5 to 200 μm, more preferably 5 to 100 μm, most preferably 5 to 30 μm. A usable polymeric porous substrate may be a microporous membrane commercially available as a separator for lithium batteries. Alternatively, the polymeric porous substrate may be commercially available cellophane.

The porous substrate has preferably a mean pore diameter of at most 100 μm, more preferably at most 50 μm, for example, typically 0.001 to 1.5 μm, more typically 0.001 to 1.25 μm, further more typically 0.001 to 1.0 μm, particularly typically 0.001 to 0.75 μm, most typically 0.001 to 0.5 μm. Within these ranges, a dense LDH separator having gas-impermeability can be formed while the porous substrate keeps desirable water-permeability and required strength as a support. In the present invention, the mean pore size can be determined by measuring the largest dimension of each pore based on the electron microscopic image of the surface of the porous substrate. The electron microscopic image is measured at 20,000-fold magnification or more. All the observed pore diameters are sorted in order of size to calculate the mean value, and 30 points in total per one observed field, i.e., 15 higher points and 15 lower points from the mean value are averaged on two observed fields of views to determine the mean pore size. In the measurement, a dimension measuring function in software of SEM or image analyzing software (for example, Photoshop manufactured by Adobe) can be used.

The porous substrate has a porosity of preferably 10 to 60%, more preferably 15 to 55%, most preferably 20 to 50%. Within these ranges, a dense LDH separator having gas-impermeability can be formed while the porous substrate keeps desirable water permeability and required strength as a support. The porosity of the porous substrate can be preferably measured by Archimedes' method. In the case where the porous substrate is composed of the polymeric material and the LDH is embedded over the region of the porous substrate in the thickness direction, the porosity of the porous substrate is preferably 30 to 60%, more preferably 40 to 60%.

The LDH separator 22 can be produced by any method. The LDH separator 22 can be produced by appropriately modifying conditions of a known method for producing LDH containing functional layers and composite materials (see, for example, Patent Documents 1 to 3). For example, the LDH containing functional layer and the composite material (in other words, the LDH separator) can be produced by (1) providing a porous substrate, (2) applying a titanium oxide sol or a mixed sol of alumina and titania onto the porous substrate and then heating the sol to form a titanium oxide layer or an alumina/titania layer, (3) immersing the porous substrate into an aqueous raw material solution containing nickel ions ($Ni^{2+}$) and urea, and (4) hydrothermally treating the porous substrate in the aqueous raw material solution to form the LDH containing functional layer on the porous substrate and/or in a porous substrate. In particular, in Step (2), forming the titanium oxide layer or the alumina/titania layer on the porous substrate can not only produce a raw material for the LDH, but also serve as a seed of LDH crystalline growth and uniformly form the LDH containing functional layer that is highly densified on the surface of the porous substrate. In addition, in Step (3), the presence of urea raises the pH value through generation of ammonia in the solution through the hydrolysis of urea, and gives the LDH by formation of hydroxide with coexisting metal ions. Also, generation of carbon dioxide in hydrolysis gives the LDH of a carbonate anion type.

In particular, the composite material (in other words, the LDH separator) in which the porous substrate is composed of a polymeric material and the functional layer is embedded over the porous substrate in the thickness direction is produced by applying the mixed sol of alumina and titania to the substrate in Step (2) in such that the mixed sol permeates into all or most area of the interior pores of the substrate. By this manner, most or substantially all pores inside the porous substrate can be embedded with the LDH. Examples of preferred application include dip coating and filtration coating. Particularly preferred is dip coating. The amount of the deposited mixed sol can be varied by adjusting the number of times of coating such as dip coating. The substrate coated with the mixed sol by, for example, dip coating may be dried and then subjected to Steps (3) and (4).

EXAMPLES

A LDH separator usable in the present invention will now be described more specifically by way of the following Example.

Example 1

A LDH separator that included LDH containing Ni, Al, and Ti was made from a polymeric porous substrate according to the following steps and was evaluated.

(1) Provision of Polymeric Porous Substrate

A commercially available porous polypropylene substrate having a porosity of 50%, a mean pore diameter of 0.1 µm, and a thickness of 20 µm was cut into dimensions of 2.0 cm by 2.0 cm.

(2) Coating of Polymeric Porous Substrate with Sol of Alumina and Titania

An amorphous alumina solution (Al-ML15 available from Taki Chemical Co., Ltd.) and a titanium oxide sol solution (M6 available from Taki Chemical Co., Ltd.) were mixed into a mixed sol having a Ti/Al molar ratio of 2. The mixed sol was applied by dip coating to the cut substrate provided in Process (1). The dip coating process involved immersing the cut substrate in 100 ml of mixed sol, vertically pulling up the substrate from the mixed sol, and drying the substrate in a dryer for five minutes at 90° C.

(3) Preparation of Aqueous Stock Solution

Nickel nitrate hexahydrate ($Ni(NO_3)_2 \cdot 6H_2O$, available from Kanto Chemical Co., Inc.) and urea (($NH_2)_2CO$, available from Sigma-Aldrich) were provided for production of an aqueous stock solution. Weighed nickel nitrate hexahydrate was placed in a beaker, and deionized water was added to the beaker to produce 75 ml solution in a concentration of 0.015 mol/L. While the resultant solution was stirred, weighed urea was added to the solution such that the urea/$NO_3^-$ molar ratio was 16 to yield an aqueous stock solution.

(4) Formation of Membrane by Hydrothermal Treatment

The aqueous stock solution and the substrate after the dip coating were encapsulated in a closed Teflon® container (an autoclave having a volume of 100 ml and covered with a stainless-steel jacket). The substrate was horizontally fixed in the solution such that two sides of the substrate were in contact with the solution in the closed Teflon® container. The substrate was then subjected to a hydrothermal treatment for 24 hours at 120° C. to form LDH on and in the substrate. After the elapse of a predetermined time, the substrate was retrieved from the closed container and washed with deionized water. The substrate was dried for ten hours at 70° C., resulting in a LDH incorporated in the porous substrate. The LDH separator was thereby produced.

(5) Evaluation

The produced LDH separator was subjected to the following evaluations:

Evaluation 1: Identification of LDH separator

The crystalline phase of the LDH separator was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO. 35-0964.

Evaluation 2: Observation of Microstructure

The surface microstructure of the LDH separator was observed at an accelerating voltage of 10 to 20 kV with a scanning electron microscope (SEM, JSM-6610LV, manufactured by JEOL Ltd.). After preparation of a cross-sectional polished surface of the LDH separator with an ionic milling system (IM4000, manufactured by Hitachi High-Technologies Corporation), the microstructure of the cross-sectional polished surface was observed with the SEM under the same conditions.

Evaluation 3: Elemental Analysis (EDS)

The LDH separator was polished across the thickness for observation with a cross-sectional polisher (CP). A field of cross-sectional image of the LDH separator was observed with a 10,000-fold magnification with FE-SEM (ULTRA 55, manufactured by Carl Zeiss). The pure LDH membrane above the substrate surface and the LDH portion (by point analysis) inside the substrate in this cross-sectional image was subjected to elemental analysis at an accelerating voltage of 15 kV with an EDS analyzer (NORAN System SIX, manufactured by Thermo Fisher Scientific Inc.).

Evaluation 4: Evaluation of Alkaline Resistance

Zinc oxide was dissolved in 6 mol/L of aqueous potassium hydroxide solution to yield 5 mol/L of aqueous potassium hydroxide solution that contained 0.4 mol/L of zinc oxide. In the next stage, 15 mL of the resultant aqueous potassium hydroxide solution was placed in a closed container made of Teflon®. The LDH separator having dimensions of 1 cm×0.6 cm was placed on the bottom of the closed container, and the cover was closed. The LDH separator was held at 70° C. for three weeks or 504 hours, or seven weeks or 1176 hours and then retrieved from the closed container. The LDH separator was dried overnight at room temperature. The microstructure of the resultant sample was observed with SEM and the crystalline structure was analyzed with XRD.

Evaluation 5: Measurement of Ionic Conductivity

The conductivity of the LDH separator in the electrolytic solution was measured with an electrochemical measurement system shown in FIG. 7. A LDH separator sample S was held between two silicone gaskets 40 having a thickness of 1 mm and assembled into a PTFE flange-type cell 42 having an inner diameter of 6 mm. Electrodes 46 made of #100 nickel wire mesh were assembled into a cylinder having a diameter of 6 mm in the cell 42, and the distance between the electrodes was 2.2 mm. The cell 42 was filled with an aqueous electrolytic solution 44 containing 6M potassium hydroxide. Using electrochemical measurement system (potentio-galvanostat frequency responsive analyzers 1287A and 1255B manufactured by Solartron), the sample was observed under the conditions of a frequency range of 1 MHz to 0.1 Hz and an applied voltage of 10 mV, and the resistance of the LDH separator sample S was determined from the intercept across a real number axis. The resistance of the porous substrate without the LDH membrane was also measured in the same manner. The resistance of the LDH membrane was determined from the difference in resistance between the LDH separator sample S and the substrate. The conductivity was determined with the resistance, the thickness, and the area of the LDH membrane.

Evaluation 6: Determination of Denseness

Figure 7A:
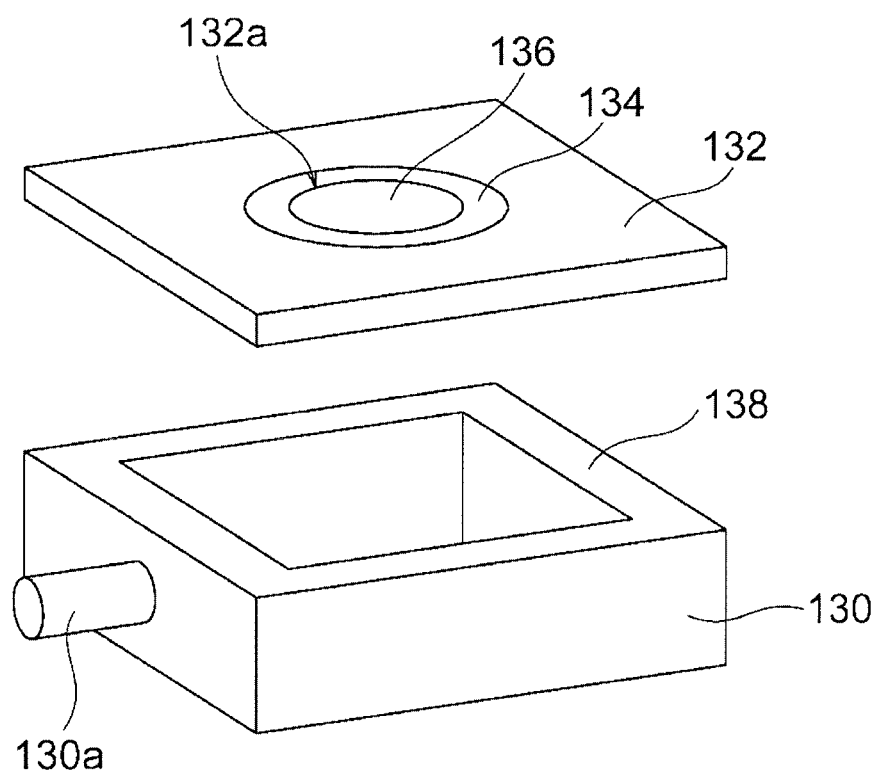
FIG. 7A is an exploded perspective view of a closed container used in the determination of denseness in Example 1.
Figure 7B:
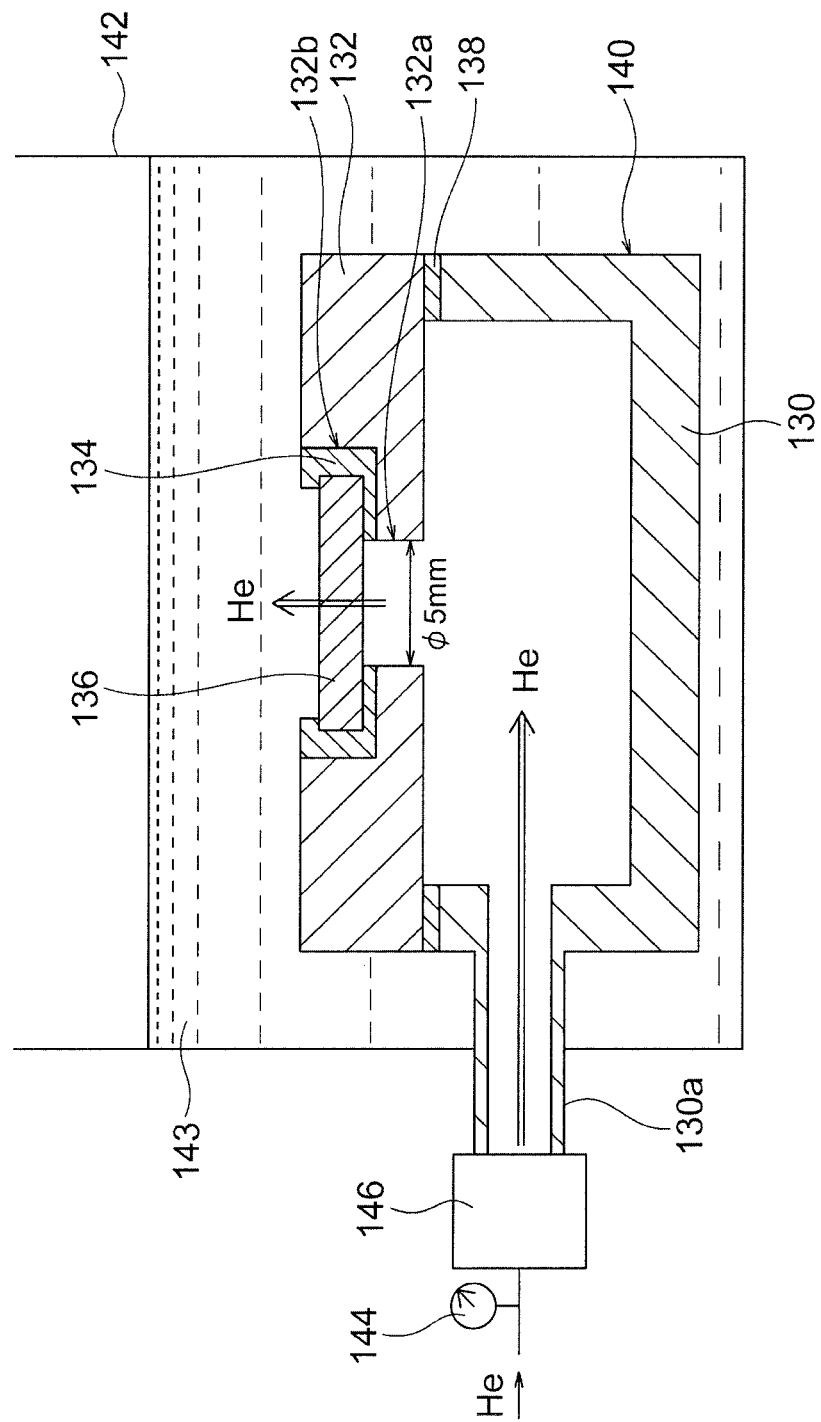
FIG. 7B is a schematic cross-sectional view of the measurement system used in the determination of denseness in Example 1.

The denseness was determined to confirm that the LDH separator had denseness with gas-impermeability. As shown in FIGS. 7A and 7B, an open acrylic container 130 and an alumina jig 132 with a shape and dimensions capable of working as a cover of the acrylic container 130 were provided. The acrylic container 130 was provided with a gas supply port 130a. The alumina jig 132 had an opening 132a having a diameter of 5 mm and a cavity 132b surrounding the opening 132a for placing the sample. An epoxy adhesive 134 was applied onto the cavity 132b of the alumina jig 132. A LDH separator sample 136 was placed into the cavity 132b and bonded to the alumina jig 132 in an air-tight and liquid-tight manner. The alumina jig 132 with the LDH separator sample 136 was then bonded to the upper end of the acrylic container 130 in an air-tight and liquid-tight manner with a silicone adhesive 138 to completely seal the open portion of the acrylic container 130. A closed container 140 was thereby completed for the measurement. The closed container 140 for the measurement was placed in a water vessel 142 and the gas supply port 130a of the acrylic container 130 was connected to a pressure gauge 144 and a flow meter 146 so that helium gas was supplied into the acrylic container 130. Water 143 was poured in the water vessel 142 to completely submerge the closed container 140 for the measurement. At this time, the air-tightness and liquid-tightness were sufficiently kept in the interior of the closed container 140 for the measurement, and one side of the LDH separator sample 136 was exposed to the internal space of the closed container 140 for the measurement while the other side of the LDH separator sample 136 was in contact with water in the water vessel 142. In this state, helium gas was introduced into the acrylic container 130 of the closed container 140 for the measurement through the gas supply port 130a. The pressure gauge 144 and the flow meter 146 were controlled such that the differential pressure between the inside and outside of the LDH separator sample 136 reached 0.5 atm (that is, the pressure of the helium gas is 0.5 atm higher than the water pressure applied to the LDH separator sample 136). Bubbling of helium gas in water from the LDH separator sample 136 was observed. If bubbling of helium gas was not observed, the LDH separator sample 136 was determined to have high denseness with gas-impermeability.

Evaluation 7: Helium Permeability

Figure 8A:
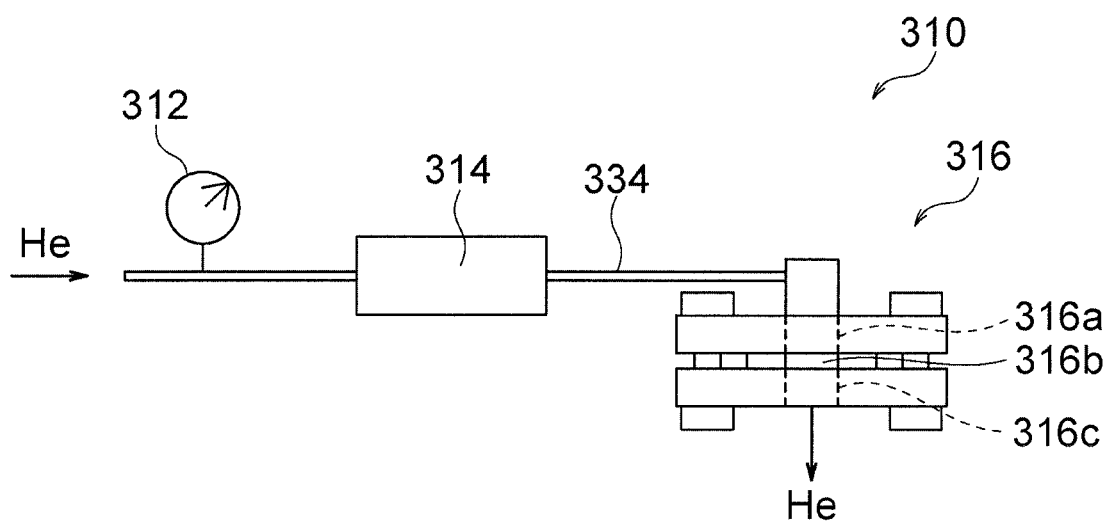
FIG. 8A is a schematic view illustrating an exemplary helium permeability measurement system used in Example 1.
Figure 8B:
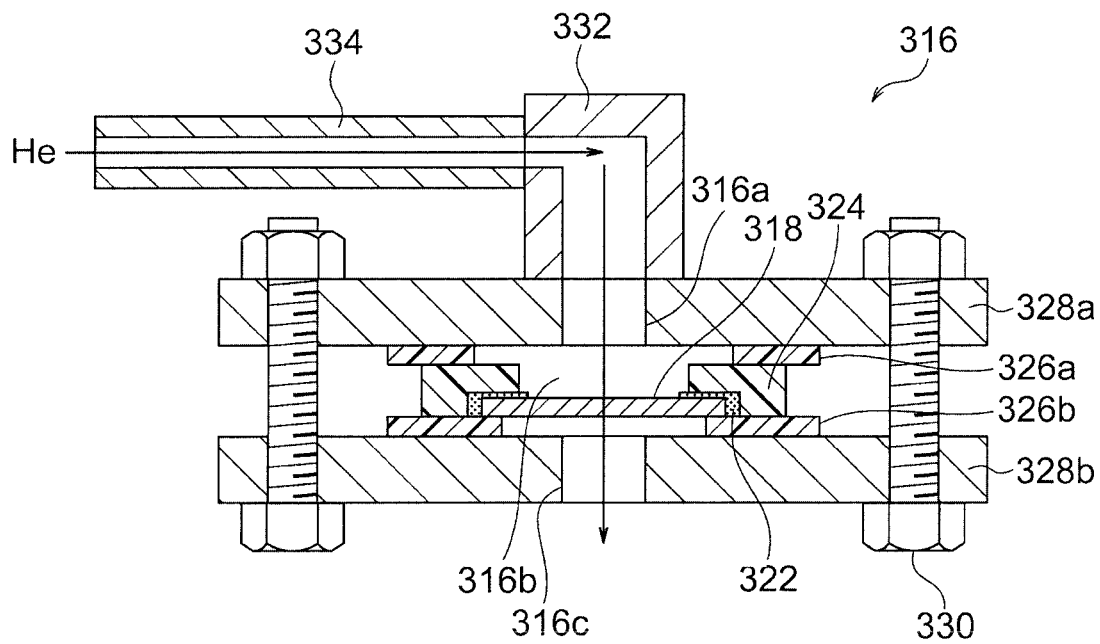
FIG. 8B is a schematic cross-sectional view of a sample holder and its peripheral configuration used in the measurement system illustrated in FIG. 8A.
Figure 9:
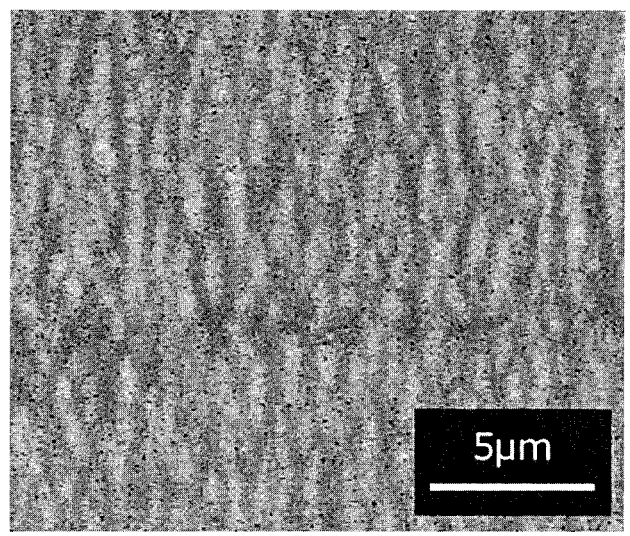
FIG. 9 is an SEM image showing the surface microstructure of the LDH separator produced in Example 1.

A helium permeation test was conducted to evaluate the denseness of the LDH separator from the viewpoint of helium permeability. The helium permeability measurement system 310 shown in FIGS. 8A and 8B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of a LDH separator 318 held by the sample holder 316. The sample holder 316 had a structure including a gas supply port 316a, a sealed space 316b and a gas discharge port 316c, and was assembled as follows: An adhesive 322 was applied along the outer periphery of the LDH separator 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each having an opening and one having a flange.

Thus, the sealed space 316b was partitioned by the LDH separator 318, the jig 324, the sealing member 326a, and the supporting member 328a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the LDH separator 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of F/(P×S) where F ($cm^3$/min) was the volume of permeated helium gas per unit time, P (atm) was the differential pressure applied to the LDH separator when helium gas permeated through, and S ($cm^2$) was the area of the membrane through which helium gas permeates. The permeation rate F ($cm^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm.

(6) Results of Evaluations

The results of the evaluations were as follows:

Rating 1: The observed XRD profile indicates that the crystalline phase of the LDH separator is confirmed to be the LDH (hydrotalcite compound).

Rating 2: As shown in the SEM image of the surface microstructure of the LDH separator in FIG. 10, the LDH is incorporated into the porous substrate over the entire thickness thereof, in other words, the pores of the porous substrate are uniformly filled with the LDH.

Rating 3: The results of EDS elemental analysis indicate that C, Al, Ti, and Ni that are constituent elements of the LDH are detected from the LDH separator. Al, Ti, and Ni are constituent elements of the basic hydroxide layer while C corresponds to $CO_3^{2-}$ that is an anion constituting the intermediate layer of the LDH.

Rating 4: no change in the microstructure of the LDH separator is observed even after immersion in the aqueous potassium hydroxide solution at 70° C. for three weeks or seven weeks.

Rating 5: The ionic conductivity of the LDH separator was 2.0 mS/cm.

Rating 6: The LDH separator was confirmed to have high denseness with gas-impermeability.

Rating 7: Helium permeability through the LDH separator was 0.0 cm/min·g atm.

What is claimed is:

1. A secondary zinc battery comprising:
a unit cell comprising;
- a positive-electrode plate comprising a positive-electrode active material layer and a positive-electrode collector;
- a negative-electrode plate comprising a negative-electrode active material layer and a negative-electrode collector, the negative-electrode active material layer comprising at least one selected from the group consisting of elemental zinc, zinc oxide, zinc alloys, and zinc compounds;
- a layered double hydroxide (LDH) separator covering or wrapping around the entire negative-electrode active material layer; and
- an electrolytic solution, wherein the positive-electrode active material layer, the negative-electrode active material layer, and the LDH separator each have a quadrilateral planar shape, wherein the positive-electrode collector has a positive-electrode collector tab extending from a first edge of the positive-electrode active material layer, and the negative-electrode collector has a negative-electrode collector tab extending from a second edge of the negative-electrode active material layer and beyond a vertical edge of the LDH separator, the first edge being opposite to the second edge, the unit cell being capable of collecting electricity from the positive-electrode collector tab and the negative-electrode collector tab, the positive-electrode collector tab and the negative-electrode collector tab being disposed at opposite edges of the unit cell, wherein the LDH separator has at least two continuous closed edges, provided that an edge, adjacent to the negative-electrode collector tab, of the LDH separator is open;

wherein the positive-electrode active material layer, the negative-electrode active material layer, and the LDH separator are disposed so that a surface of each layer is flat and parallel to the other layers over the entire surface of each layer;

wherein a vertical edge, adjacent to the negative-electrode collector tab, of the negative-electrode active material layer is covered with or wrapped by the LDH separator with a margin;

wherein the unit cell is disposed such that the positive-electrode plate, the negative-electrode plate, and the LDH separator are vertically disposed and one closed edge of the LDH separator resides on a bottom of the unit cell, thereby the positive-electrode collector tab and the negative-electrode tab extend from the opposite edges of the unit cell; and wherein the LDH separator has an open upper edge, or a closed upper edge at which a vent is disposed.

2. The secondary zinc battery according to claim 1, further comprising a liquid retention material disposed between the negative-electrode active material layer and the LDH separator, the liquid retention material covering or wrapping around the entire negative-electrode active material layer.

3. The secondary zinc battery according to claim 2, wherein the liquid retention material is a non-woven fabric.

4. The secondary zinc battery according to claim 1, further comprising a case accommodating the unit cell.

5. The secondary zinc battery according to claim 1, further comprising a positive-electrode collector plate connected to an end of the positive-electrode collector tab and a negative-electrode collector plate connected to an end of the negative-electrode collector tab.

6. The secondary zinc battery according to claim 1, wherein there are a plurality of the unit cells accommodated in a case.

7. The secondary zinc battery according to claim 1, wherein the at least two continuous closed edges of the LDH separator are formed by folding and/or sealing.

8. The secondary zinc battery according to claim 1, wherein the LDH separator comprises LDH and a porous substrate, pores of the substrate being filled with the LDH, thereby the LDH separator has hydroxide-ion conductivity and gas-impermeability.

9. The secondary zinc battery according to claim 8, wherein the porous substrate is composed of a polymeric material.

10. The secondary zinc battery according to claim 9, wherein the LDH is incorporated into the porous substrate over the entire thickness thereof.

11. The secondary zinc battery according to claim 1, wherein the secondary zinc battery is a secondary nickel-zinc battery comprising the positive-electrode active material layer that comprises nickel hydroxide and/or nickel oxyhydroxide.

12. The secondary zinc battery according to claim 1, wherein the secondary zinc battery is a secondary zinc-air battery comprising the positive-electrode active material layer that is an air electrode layer.

* * * * *